(12) United States Patent
Whynot (10) Patent No.: US 10,880,428 B2
(45) Date of Patent: Dec. 29, 2020

(54) SELECTIVE COMMUNICATION EVENT EXTRACTION (71) Applicant: Avaya Inc., Santa Clara, CA (US)

(72) Inventor: Stephen R. Whynot, Allen, TX (US)

(73) Assignee: Avaya Inc., Santa Clara, CA (US)

(*) Notice: Subject to any disclaimer, the term of this patent is extended or adjusted under 35 U.S.C. 154(b) by 171 days.

(21) Appl. No.: 16/102,124

(22) Filed: Aug. 13, 2018

(65) Prior Publication Data
US 2020/0053203 A1 Feb. 13, 2020

(51) Int. Cl.
*H04M 3/22* (2006.01)
*H04M 3/51* (2006.01)
*G06F 17/30* (2006.01)
*G06F 16/683* (2019.01)

(52) U.S. Cl.
CPC ........ *H04M 3/2218* (2013.01); *G06F 16/685* (2019.01); *H04M 3/5183* (2013.01); *H04M 2203/301* (2013.01); *H04M 2203/552* (2013.01); *H04M 2203/558* (2013.01)

(58) Field of Classification Search
None
See application file for complete search history.

(56) References Cited

U.S. PATENT DOCUMENTS

| 8,634,543 | B2 | 1/2014 | Flockhart et al. |
| 2009/0080640 | A1* | 3/2009 | Waalkes ............ H04M 3/42221 379/265.06 |
| 2010/0235218 | A1 | 9/2010 | Erhart et al. |
| 2010/0296417 | A1 | 11/2010 | Steiner |
| 2011/0125793 | A1 | 5/2011 | Erhart et al. |
| 2011/0125826 | A1 | 5/2011 | Erhart et al. |
| 2012/0189284 | A1* | 7/2012 | Morrison ................ G06F 16/58 386/282 |
| 2018/0270346 | A1* | 9/2018 | Donnenwirth ...... H04M 3/2218 |

* cited by examiner

*Primary Examiner* — Harry S Hong
(74) *Attorney, Agent, or Firm* — Sheridan Ross P.C.

(57) ABSTRACT

Communication events often produce a significant volume and variety of data. While such data is often useful as a teaching or configuration tool or as a source of troubleshooting information, such information often results in "information overload." By providing a "highlight reel," communication data comprising only relevant information, which may be further limited to a specific number of duration of events, allows for key data to be identified for presentation and avoid the need to further process, store, or otherwise maintain irrelevant or less relevant data.

20 Claims, 5 Drawing Sheets

SELECTIVE COMMUNICATION EVENT EXTRACTION

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for system optimization and particularly to identifying communications events within the system.

BACKGROUND

Communications within large systems, such as contact centers, can be numerous. Such systems may have many thousands of communications each day and in a variety of formats (e.g., voice, video, email, text, etc.). It is often desirable to identify particular communications and/or communication types to measure overall or particular activity of the system and ensure efficient and problem-free operations. When the system is discovered to be problematic or less efficient, appropriate action can be selected and implemented.

SUMMARY

These and other needs are addressed by the various embodiments and configurations of the present invention. The present invention can provide a number of advantages depending on the particular configuration. These and other advantages will be apparent from the disclosure of the invention(s) contained herein.

Getting a sample of the actual customer/agent voice/video/text interactions in a contact center can be challenging in systems with a large volume of raw recorded data and metrics. It is therefore a benefit of the embodiments provided herein to provide an efficient (e.g., reduced demand on processing, communications, and/or networking components) means to compile and highlight relevant interactions. The interactions may be specified by a particular client of the system in a condensed, easy to consume way would provide valuable insight and save time.

The term "client" as used herein refers to the party utilizing a system, either self-operated or contracted to a contact center service provider, to provide communications to other parties, such as end-customers, prospective customers, employees (e.g., consumers of employee benefits), etc. (collectively, "customers"). For example, an individual that needs to rebook an airline flight is an example of a customer. The customer calls a contact center that is owned by, operated by, and/or contracted to operate on behalf of, the airline; the airline being an example of a client. Contact centers may be dedicated to service customers of one client or utilize all or a portion of the same equipment and/or personnel to provide communication services to customers of more than one client.

In one embodiment, a sampling of contact center customer/agent interactions into a "highlight reel," similar to how sporting events are summarized into highlights for quick consumption during a news broadcast. The highlights could be customized by assigning criteria such as contact type, customer mood, emotion, topic, geographical region, etc. with a configurable timespan. Artificial intelligence is used to analyze audio and/or video recordings, textual messaging interactions and other data. The data would be presented in the form of an audio or video, and would contain multiple clips from various interactions that met the criteria. Automated execution may be provided for the generation of the sampling and/or "highlight reel" and system improvements may be automatically made in response thereto. In another embodiment, the "highlight reel" may be presented alone or with other content that allows for interactive playback, such as to drill-down and/or up to present the user with more or less information regarding the content of the "highlight reel."

In one embodiment, a system is disclosed, comprising: a microprocessor, comprising a memory for the storage of instructions for execution by the microprocessor; a communications interface; and a data storage accessible to the microprocessor via the communication interface; and wherein the microprocessor: accesses the data storage comprising communication events; accesses a criterion; accessing a duration limit; identifies a first subset of communication events comprising communication events that match the criterion and wherein the first subset of communication events is restricted to no more than the duration limit; and causes the data storage to store indicia of the first subset.

In another embodiment, a method is disclosed comprising: accessing a data storage comprising communication events; accessing a criterion; accessing a duration limit; identifying a first subset of communication events comprising communication events that match the criterion and wherein the first subset of communication events is restricted to no more than the duration limit; and causing the data storage to store indicia of the first subset.

In another embodiment a system, comprising: means to accessing a data storage comprising communication events; means to accessing a criterion; means to accessing a duration limit; means to identifying a first subset of communication events comprising communication events that match the criterion and wherein the first subset of communication events is restricted to no more than the duration limit; and means to causing the data storage to store indicia of the first subset.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
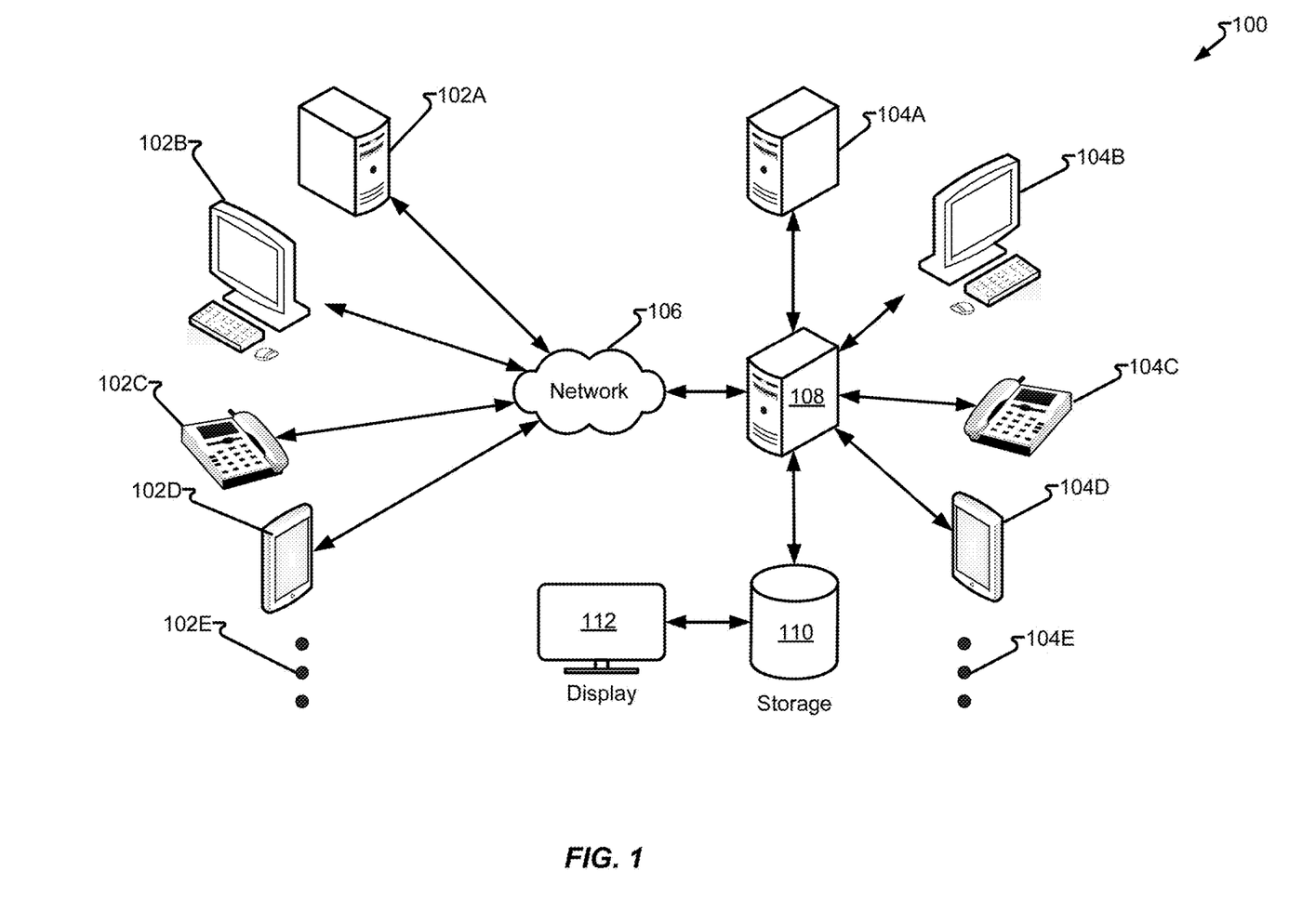
FIG. 1 depicts a first system in accordance with embodiments of the present disclosure.

FIG. 1 depicts system 100 in accordance with embodiments of the present disclosure. In one embodiment, customer endpoint 102 comprises one or more devices and/or device types, such as customer endpoint 102A being a server, computer, or other communication component; customer endpoint 102B comprising a computer, laptop, or other application-executing device, such as to execute a softphone, messaging system, video/voice-over-IP, etc. customer endpoint 102A and customer endpoint 102B may operate independently or cooperatively. Customer endpoint 102C may be embodied as a telephone (e.g., plain old telephone system (POTS) device, and/or a voice-over-IP (VoIP) device); Customer endpoint 102D may be a handheld device, such as a personal data assistant, cellular telephone/ smart-phone, etc., which may communicate via cellular communications and/or other wired or wireless networking communications (e.g., WiFi, WiMax, Bluetooth, etc.); and other customer endpoint 102E which may comprise other current or future communication devices for use by a customer to communicate with one or more contact center endpoint 104.

In another embodiment, contact center endpoint 104 comprises one or more devices and/or device types, such as contact center endpoint 104A which may comprise an automated agent (e.g., interactive voice response, option tree, etc.); contact center endpoint 104B, which may comprise a communication terminal with software and/or communications to other components (e.g., processors, storage devices, etc.) and may be operated, in part, by a human agent; contact center endpoint 104C which may be embodied a telephone (e.g., POTS, VoIP, etc.); contact center endpoint 104D may be a handheld device, such as a personal data assistant, cellular telephone/smart-phone, etc., which may communicate via cellular communications and/or other wired or wireless networking communications (e.g., WiFi, WiMax, Bluetooth, etc.); and other contact center endpoint 104E which may comprise other current or future communication devices for use by a customer to communicate with one or more customer endpoint 102.

System 100 omits common components typically utilized to facilitate communication between one or more customer endpoint 102 and one or more contact center endpoint 104. Network 106 may be or support communications comprising one or more types (e.g., video, analog voice, digital voice, text, etc.) and/or media (e.g., telephony, Internet, etc.). Network 106 may comprise portions of other networks (e.g., ethernet, WiFi, etc.) and/or virtual networks (e.g., VPN, etc.). Communications between ones of customer endpoint 102 and ones of contact center endpoint 104 may be intercepted or monitored by server 108 having a microprocessor with a memory integrated therewith or accessible. Server 108 monitors the connect of the communication (e.g., spoken words, words/characters in a text or email message, etc.) and, if a criterion is met, cause at least a portion of the communication to be stored in data storage 110. In another embodiment, data storage 110 may maintain an index, pointer, or other indicia to reference to the portion of the communication. The portions of the communication maintained in data storage 110 may then be presented on display 112, such as a "highlight reel." Data storage 110 may also be populated with metadata for display along with the highlight reel and/or portions thereof. The metadata will be discussed more completely with respect to FIG. 3.

Figure 2:
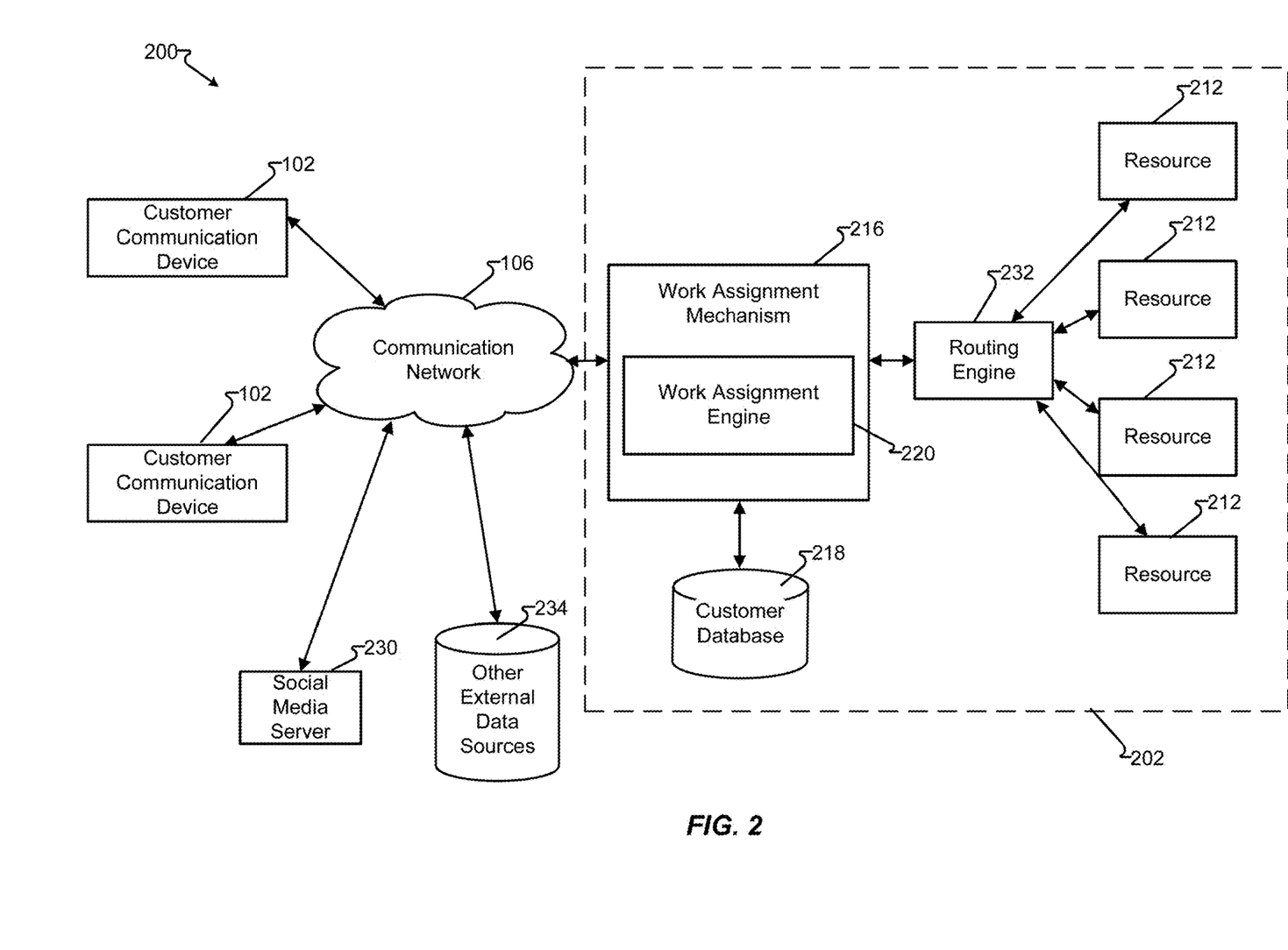
FIG. 2 depicts a second system in accordance with embodiments of the present disclosure.

With reference now to FIG. 2, communication system 200 is discussed in accordance with at least some embodiments of the present disclosure. The communication system 200 may be a distributed system and, in some embodiments, comprises a communication network 106 connecting one or more contact center endpoint 104 to a work assignment mechanism 216, which may be owned and operated by an enterprise administering contact center 202 in which a plurality of resources 212 is distributed to handle incoming work items (in the form of contacts) from customer endpoint 102. One or more of the plurality of resources 212 may be implemented as, or utilize, one or more contact center endpoint 104 devices or types thereof.

Contact center 202 is variously embodied to receive and/or send messages that are or are associated with work items and the processing and management (e.g., scheduling, assigning, routing, generating, accounting, receiving, monitoring, reviewing, etc.) of the work items by one or more resources 212. The work items are generally generated and/or received requests for a processing resource 212 embodied as, or a component of, an electronic and/or electromagnetically conveyed message. Contact center 202 may include more or fewer components than illustrated and/or provide more or fewer services than illustrated. The border indicating contact center 202 may be a physical boundary (e.g., a building, campus, etc.), legal boundary (e.g., company, enterprise, etc.), and/or logical boundary (e.g., resources 212 utilized to provide services to customers for a customer of contact center 202).

Furthermore, the border illustrating contact center 202 may be as-illustrated or, in other embodiments, include alterations and/or more and/or fewer components than illustrated. For example, in other embodiments, one or more of resources 212, customer database 218, and/or other component may connect to routing engine 232 via communication network 106, such as when such components connect via a public network (e.g., Internet). In another embodiment, communication network 106 may be a private utilization of, at least in part, a public network (e.g., VPN); a private network located, at least partially, within contact center 202; or a mixture of private and public networks that may be utilized to provide electronic communication of components described herein. Additionally, it should be appreciated that components illustrated as external, such as social media server 230 and/or other external data sources 234 may be within contact center 202 physically and/or logically, but still be considered external for other purposes. For example, contact center 202 may operate social media server 230 (e.g., a website operable to receive user messages from customers and/or resources 212) as one means to interact with customers via their customer endpoint 102.

Customer endpoints 102 are embodied as external to contact center 202 as they are under the more direct control of their respective user or customer. However, embodiments may be provided whereby one or more customer endpoints 102 are physically and/or logically located within contact center 202 and are still considered external to contact center 202, such as when a customer utilizes customer communication device 102 at a kiosk and attaches to a private network of contact center 202 (e.g., WiFi connection to a kiosk, etc.), within or controlled by contact center 202.

It should be appreciated that the description of contact center 202 provides at least one embodiment whereby the following embodiments may be more readily understood without limiting such embodiments. Contact center 202 may be further altered, added to, and/or subtracted from without departing from the scope of any embodiment described herein and without limiting the scope of the embodiments or claims, except as expressly provided.

Additionally, contact center 202 may incorporate and/or utilize social media website 230 and/or other external data sources 234 may be utilized to provide one means for a resource 212 to receive and/or retrieve contacts and connect to a customer of a contact center 202. Other external data sources 234 may include data sources, such as service bureaus, third-party data providers (e.g., credit agencies, public and/or private records, etc.). Customers may utilize their respective customer endpoint 102 to send/receive communications utilizing social media server 230.

In accordance with at least some embodiments of the present disclosure, the communication network 106 may comprise any type of known communication medium or collection of communication media and may use any type of protocols to transport electronic messages between endpoints. The communication network 106 may include wired and/or wireless communication technologies. The Internet is an example of the communication network 106 that constitutes an Internet Protocol (IP) network consisting of many computers, computing networks, and other communication devices located all over the world, which are connected through many telephone systems and other means. Other examples of the communication network 106 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 106 need not be limited to any one network type and instead may be comprised of a number of different networks and/or network types. As one example, embodiments of the present disclosure may be utilized to increase the efficiency of a grid-based contact center 202. Examples of a grid-based contact center 202 are more fully described in U.S. Patent Publication No. 2010/0296417 to Steiner, the entire contents of which are hereby incorporated herein by reference. Moreover, the communication network 106 may comprise a number of different communication media, such as coaxial cable, copper cable/wire, fiber-optic cable, antennas for transmitting/receiving wireless messages, and combinations thereof.

The customer endpoints 102 may correspond to customer communication devices. In accordance with at least some embodiments of the present disclosure, a customer may utilize their customer endpoint 102 to initiate a work item. Illustrative work items include, but are not limited to, a contact directed toward and received at a contact center 202, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 106. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 216, but rather may be on some other server in the communication network 106 where it is harvested by the work assignment mechanism 216, which generates a work item for the harvested communication, such as social media server 230. An example of such a harvested communication includes a social media communication that is harvested by the work assignment mechanism 216 from a social media network or server 230. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 104 and the format of the communication. In particular, work items are logical representations within a contact center 202 of work to be performed in connection with servicing a communication received at contact center 202 (and, more specifically, the work assignment mechanism 216). The communication may be received and maintained at the work assignment mechanism 216, a switch or server connected to the work assignment mechanism 216, or the like, until a resource 212 is assigned to the work item representing that communication. At which point, the work assignment mechanism 216 passes the work item to a routing engine 232 to connect the communication device 104, which initiated the communication, with the assigned resource 212.

Although the routing engine 232 is depicted as being separate from the work assignment mechanism 216, the routing engine 232 may be incorporated into the work assignment mechanism 216 or its functionality may be executed by the work assignment engine 220.

In accordance with at least some embodiments of the present disclosure, the contact center endpoint 104 may comprise any type of known communication equipment or collection of communication equipment. Examples of a suitable communication device 104 include, but are not limited to, a personal computer, laptop, Personal Digital Assistant (PDA), cellular phone, smart phone, telephone, or combinations thereof. In general, each communication device 104 may be adapted to support video, audio, text, and/or data communications with other contact center endpoint 104 as well as the processing resources 212. The type of medium used by the communication device 104 to communicate with other contact center endpoints 104 or processing resources 212 may depend upon the communication applications available on the contact center endpoint 104.

In accordance with at least some embodiments of the present disclosure, the work item is sent toward a collection of processing resources 212 via the combined efforts of the work assignment mechanism 216 and routing engine 232. The resources 212 can either be completely automated resources (e.g., Interactive Voice Response (IVR) units, microprocessors, servers, or the like), human resources utilizing contact center endpoint 104 (e.g., human agents utilizing a computer, telephone, laptop, etc.), or any other resource known to be used in contact center 202.

As discussed above, the work assignment mechanism 216 and resources 212 may be owned and operated by a common entity in a contact center 202 format. In some embodiments, the work assignment mechanism 216 may be administered by multiple enterprises, each of which has its own dedicated resources 212 connected to the work assignment mechanism 216.

In some embodiments, the work assignment mechanism 216 comprises a work assignment engine 220, which enables the work assignment mechanism 216 to make intelligent routing decisions for work items. In some embodiments, the work assignment engine 220 is configured to administer and make work assignment decisions in a queue-less contact center 202, as is described in U.S. patent application Ser. No. 12/882,950, the entire contents of which are hereby incorporated herein by reference. In other embodiments, the work assignment engine 220 may be configured to execute work assignment decisions in a traditional queue-based (or skill-based) contact center 202.

The work assignment engine 220 and its various components may reside in the work assignment mechanism 216 or in a number of different servers or processing devices. In some embodiments, cloud-based computing architectures can be employed whereby one or more components of the work assignment mechanism 216 are made available in a cloud or network such that they can be shared resources among a plurality of different users. Work assignment mechanism 216 may access customer database 218, such as to retrieve records, profiles, purchase history, previous work items, and/or other aspects of a customer known to contact center 202. Customer database 218 may be updated in response to a work item and/or input from resource 212 processing the work item.

It should be appreciated that one or more components of contact center 202 may be implemented in a cloud-based architecture in their entirety, or components thereof (e.g., hybrid), in addition to embodiments being entirely on-premises. In one embodiment, customer endpoint 102 is connected to one of resources 212 via components entirely hosted by a cloud-based service provider, wherein processing and data storage elements may be dedicated to the operator of contact center 202 or shared or distributed amongst a plurality of service provider customers, one being contact center 202.

In one embodiment, a message is generated by customer endpoint 102 and received, via communication network 106, at work assignment mechanism 216. The message received by a contact center 202, such as at the work assignment mechanism 216, is generally, and herein, referred to as a "contact." Routing engine 232 routes the contact to at least one of resources 212 for processing.

Figure 3:
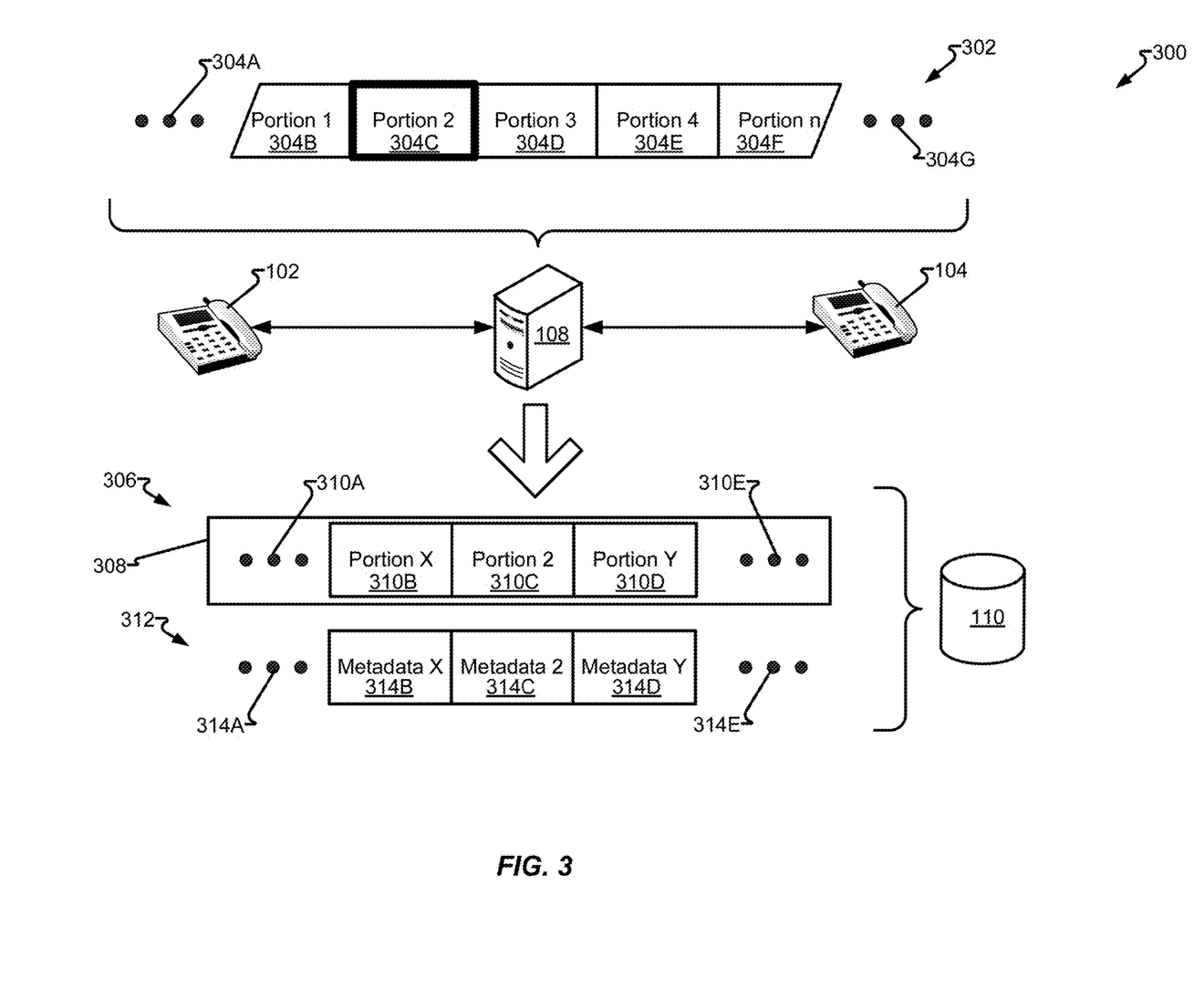
FIG. 3 shows a block diagram in accordance with embodiments of the present disclosure.

FIG. 3 shows block diagram 300 in accordance with embodiments of the present disclosure. In one embodiment, communication stream 302 comprises portions 304, specifically portions 304A-304G as provided in a communication between customer endpoint 102 and contact center endpoint 104 as monitored by server 108. A portion is variously embodied and may be comprise one or more of a different topic, content, speaker, etc.; contain a particular word, phrase, term; contain an attribute of a speaker or writer (e.g., emotion, tone, cussing, gratitude, etc.); contain a speech or textual attribute; a change in any one or more of the foregoing as compared to a preceding or following portion.

In addition to a particular element utilized in determining a portion, a portion may be padded so as to contain sufficient preceding and/or following communication content to provide sufficient meaning, use, or other context. The padding may include the particular element and the entire full sentence or sentence fragment, when an incomplete sentence is provided, that comprises the element. The portion may be expanded to include an introduction that includes identification of the element, such as a particular item of discussion (e.g., product or service bought, sold, serviced, or enhanced by the contact center); the content of the communication comprising a question asked and an answer; the content of the communication where an attribute defining a portion (e.g., frustration, anger) through a change in the attribute (e.g., satisfied, furious, etc.). In yet another embodiment, a time period may be utilized, such as fifteen seconds of audio before a particular element was provided in the communication and ten seconds after the element was provided. In yet another embodiment, may comprise a contiguous portion of the communication absent any particular elements defining a portion. For example, a customer talks for fourth-five seconds about the weather and any twenty second period absent any determined element indicating a portion is then itself determined to be a null portion for use in considering any change in the communication, which may then be used to determine a portion for a preceding or following portion, such as after discussing the weather, the customer discusses a product they purchased.

More specifically, communication stream 302 comprises a number of portions 304. Portion 304A may be one or more preceding portions, if present, such as communications with other agents, automated agents (e.g., IVR), etc. Similarly, portion 304G may be any subsequent portion, such as discussing next steps, concluding the communication, etc. Portions 304B-304F represent one communication whereby one portion 304B-304F differs from a preceding or following portion 304B-304F. As discussed about, the difference may be the use of a particular word, phrase, tone, etc., or a change therein, which may be padded with sufficient communication content to provide sufficient information on the use thereof.

Server 108 monitors communication stream 302 and determines if any portion matches a previously determined or selected criterion. For example, the mentioning of a new product's name may be a criterion, a cuss word may be a criterion, yelling may be a criterion, or other aspect of the communication determined to be of interest. Portion 304C may be identified by server 108 has matching the criterion and, if so, provided to data storage 110 in the form of record 306. Record 306 may comprise a time-limited window 308, such that only a particular duration of selected portions 310 are maintained within time-limed window 308. Adding a portion to time-limited window 308, when already full, may produce an error, be ignored, or cause a previously added portion to be removed from time-limited window 308. In one embodiment, time-limited window 308 is a highlight reel.

Here, time-limited window 308 comprises, in part, portion 310C which may be a reference, index, pointer, address, or other indicia of portion 304C or, in another embodiment, the content or copy of the content of portion 304C. In another embodiment, record 312 may comprise metadata associated with time-limited window 308 or constitute portions 310.

Metadata may comprise data elements describing a purpose of a communication (e.g., purchase, complain, return, inquire, etc.) a particular good or service; type of communication (e.g., POTS, VoIP, etc.); customer attribute (e.g., age, mood, tone, etc.); date, time, location, etc.; and/or other attribute providing additional context to the communication and portion. Additionally or alternatively, the content of metadata 314 may be textual and maintained in data storage 110. Portions of communication 302 not determined to have a relevant portion (e.g., portions 304A, 304B, 304D-304G) may be discarded such that data storage 110 only maintains the relevant portion (e.g., portion 304C/310C) and, optionally, the associated metadata (e.g., metadata 314C).

Figure 4:
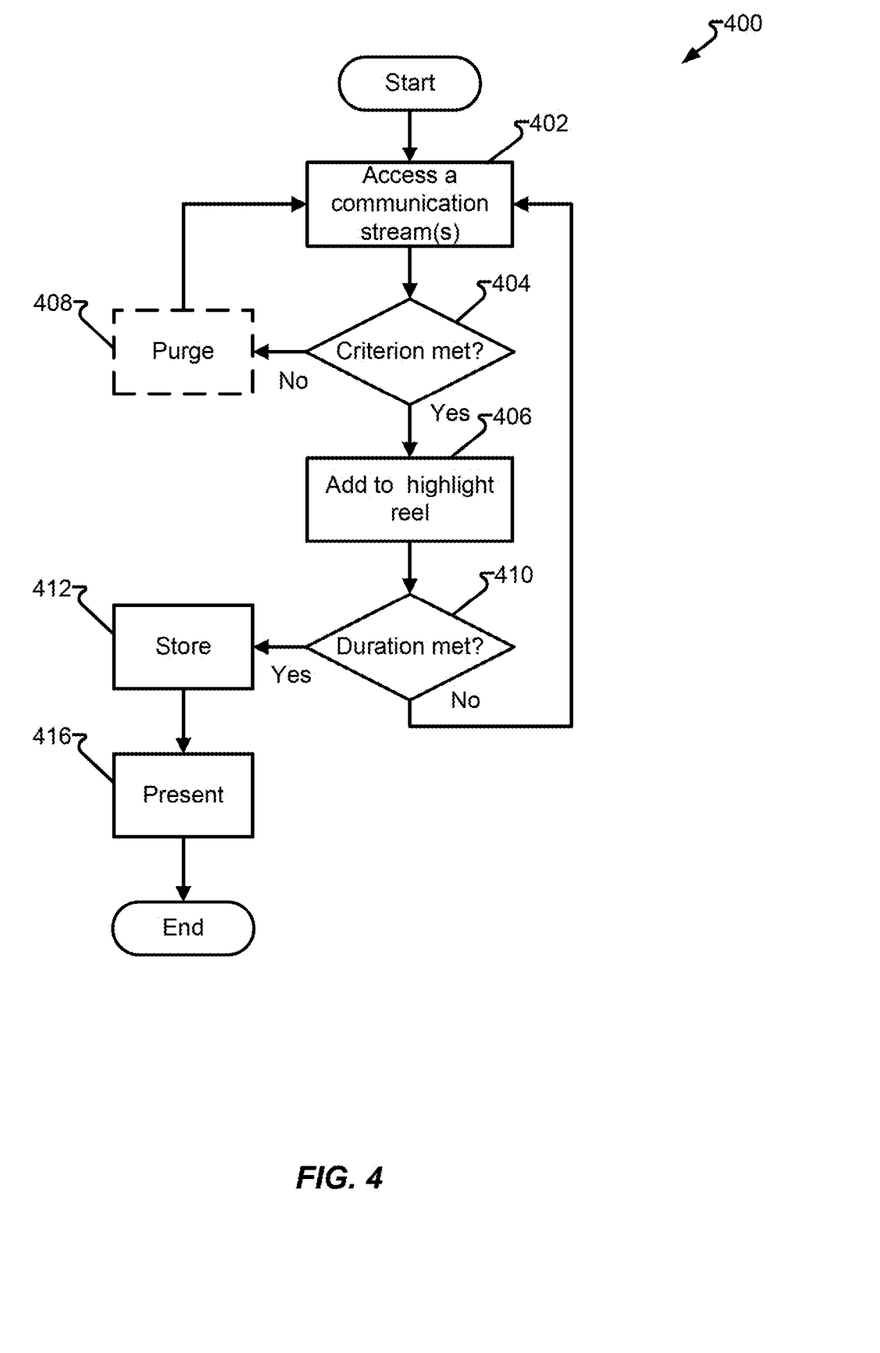
FIG. 4 depicts a first process in accordance with embodiments of the present disclosure.

FIG. 4 depicts process 400 in accordance with embodiments of the present disclosure. In one embodiment, process 400 begins at step 402 whereby a communication stream is accessed. Embodiments further include accessing a real-time communication stream or a recorded stream. The stream may be voice, voice and video, and/or text, such as a communication between customer endpoint 102 and contact center endpoint 104 via network 106 as monitored by server 108. Next, test 404 determines if a criterion has been met, such as if a portion of the communication monitored in step 402 contains a previously determined word or phrase, attribute of a speaker, etc. If test 404 is determined in the negative, process 400 may proceed to step 402 to continue monitoring the same or different communication stream. Optionally, step 408 may purge, not save, or otherwise remove the portion from storage and/or from consideration from further processing.

If test 404 is determined in the affirmative, step 406 is executed whereby the portion is added to the highlight reel, such as time-limited window 308. Test 410 determines if the duration limit has been met and, if determined in the negative, process 400 may continue processing back to step 402 to determine if a subsequent portion of the same communication or a portion of a different communication comprises a criteria meeting portion, as determined by a subsequent iteration of test 404. If test 410 is met, step 412 is executed whereby the portion, or indicia of the portion associated with the portion, is stored for presentation by step 416.

In yet another embodiment, step 402 may access a communication in the form of previously determined time-limited window 308, such that a subsequent time-limited window (or "highlight reel") may be provided. For example, a first iteration of process 400 may be performed on communications for a day, a subsequent iteration of process 400 may be performed on a number of days to produce a weekly time-limited window, and so on for months, quarters, etc. Additionally or alternatively, a particular topic may be utilized, such that all communications regarding air travel and otherwise satisfying the criteria are processed, then a subsequent iteration, such as air travel between New York and London produced, etc. As a further addition or alternative, scale or scoring may be provided, such that one iteration of mild swearing is included in a time-limited window but a subsequent iteration is more serious cursing and/or the inclusion of other attributes (e.g., frustration, etc.).

Figure 5:
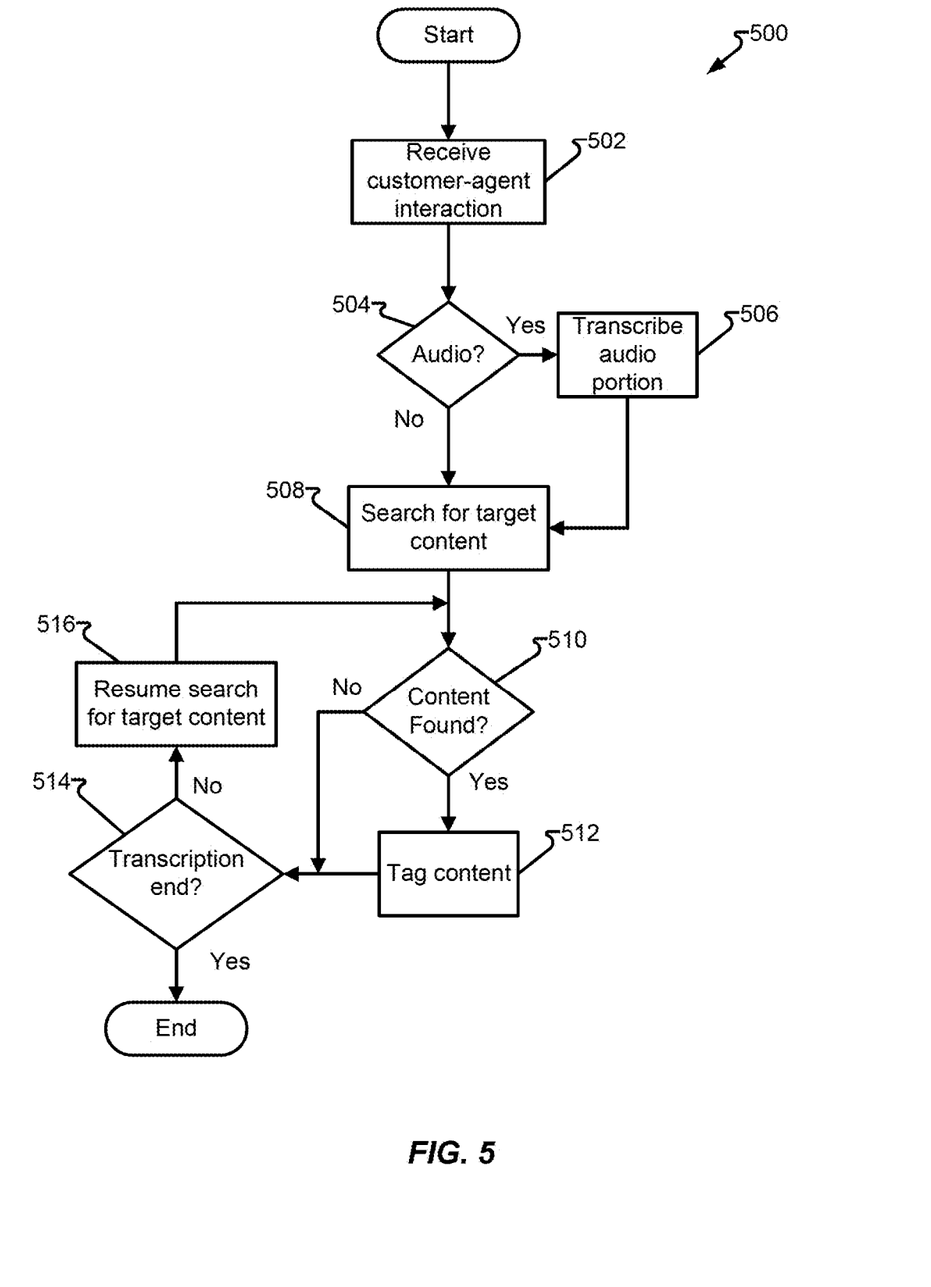
FIG. 5 depicts a second process in accordance with embodiments of the present disclosure.

FIG. 5 depicts process 500 in accordance with embodiments of the present disclosure. In one embodiment, step 502 receives a customer-agent interaction. The interaction may be received via accessing a stored/recorded customer-agent interaction or in real-time via monitoring a portion of the communication link between customer endpoint 102 and contact center endpoint 104, such as by server 108. If step 504 determines the interaction comprises audio and, if so, is determined in the affirmative. If the interaction is textual, step 504 is determined in the negative. Step 506 transcribes the audio portion to provide a text record for further processing.

Step 508 searches the interaction for target content. The target content may be a previously selected term, such as to see if the interaction discussed a "product alpha" or other specified term, such as a particular product or service. The content may be more general, such as the use of profanity, strong language, emotion (positive or negative), etc. It should be appreciated that step 508, and the remainder of process 500, may identify and process more than one criteria.

Step 510 determines if the content is found and, if yes, tags the content in step 512. The tagging may write data to a database, such as storage 110. Tagging may comprise one or more of the text where the content was found in the interaction, search criteria utilized by step 508, timestamp, link to audio content, audio content, context (e.g., customer demographics, why they called/emailed, etc., outbound campaign, etc.). The resulting tagged content may also be compressed (e.g., portions of the interaction not related to the portion having the identified content may be removed, the audio portion deleted, etc.) so that data storage may be reduced. The tagged content is then available for presentation as the "highlight reel."

If step 514 determines the transcript is at an end, process 500 may end or be repeated for a subsequent interaction. If step 514 is determined in the negative, step 516 resumes the search and continues process 500.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose microprocessor (e.g., GPU, CPU), or logic circuits programmed with the instructions to perform the methods (e.g., FPGA). In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
a microprocessor, comprising a memory for the storage of instructions for execution by the microprocessor;
a communications interface; and
a data storage accessible to the microprocessor via the communication interface; and
wherein the microprocessor:
accesses the data storage comprising communication events;
accesses a criterion;
accessing a duration limit;
identifies a first subset of communication events comprising communication events that match the criterion and wherein the first subset of communication events is restricted to no more than the duration limit; and
causes the data storage to store indicia of the first subset.

2. The system of claim 1, further comprising:
a display device; and
wherein the microprocessor further accesses the indicia of the first subset and presents, via display device, communication events associated with the indicia of the first subset.

3. The system of claim 1, wherein the indicia of the first subset comprises the content of the first subset of communication events.

4. The system of claim 1, wherein the processor deletes a second subset of the communication events from the data storage, wherein the second subset comprises the communication events that are not members of the first subset.

5. The system of claim 1, wherein the microprocessor further condenses the first subset to exclude a portion of at least one communication event of the first subset that is not associated with the criterion.

6. The system of claim 5, wherein the portions of at least one communication event comprises at least one of a portion that introduces the portion comprising the criterion or a portion that concludes the portion comprising the criterion.

7. The system of claim 1, wherein the microprocessor annotates at least one member of the first subset of communication events with metadata associated with the criterion.

8. The system of claim 7, wherein the metadata is extracted from the at least one member of the first subset of communication events.

9. The system of claim 7, wherein the annotation comprises visual representations.

10. The system of claim 7, wherein the metadata comprises one or more of reason for the communication, attribute of a customer, subject goods or services, or temporal data associated with the occurrence of the at least one member of the first subset.

11. The system of claim 1, wherein the indicia comprises a set of indicia for each of the first subset.

12. A method, comprising:
accessing, by a microprocessor, a data storage comprising communication events;
accessing, by the microprocessor, a criterion;
accessing, by the microprocessor, a duration limit;
identifying, by the microprocessor, a first subset of communication events comprising communication events that match the criterion and wherein the first subset of communication events is restricted to no more than the duration limit; and
causing, by the microprocessor, the data storage to store indicia of the first subset.

13. The method of claim 12, further comprising:
accessing, by the microprocessor, the indicia of the first subset; and
presenting for output on a display connected via the communication interface, a presentation comprising the first subset, wherein the presentation serially presents ones of the first subset.

14. The method of claim 12, further comprising deleting a second subset of the communication events from the data storage, wherein the second subset comprises the communication events that are not members of the first subset.

15. The method of claim 12, further comprising condensing the first subset to exclude a portion of at least one communication event of the first subset that is not associated with the criterion.

16. The method of claim 15, wherein the portions of at least one communication event comprises at least one of a portion that introduces the portion comprising the criterion or a portion that concludes the portion comprising the criterion.

17. The method of claim 12, further comprising, annotating at least one member of the first subset of communication events with metadata associated with the criterion.

18. The method of claim 17, wherein the metadata comprises one or more of reason for the communication, attribute of a customer, subject goods or services, or temporal data associated with the occurrence of the at least one member of the first subset.

19. A system, comprising:
- means to accessing a data storage comprising communication events;
- means to accessing a criterion;
- means to accessing a duration limit;
- means to identifying a first subset of communication events comprising communication events that match the criterion and wherein the first subset of communication events is restricted to no more than the duration limit; and
- means to causing the data storage to store indicia of the first subset.

20. The system of claim 19, further comprising, means to delete a second subset of the communication events from the data storage, wherein the second subset comprises the communication events that are not members of the first subset.

* * * * *